United States Patent [19]

Pircher

[11] Patent Number: 5,079,543
[45] Date of Patent: Jan. 7, 1992

[54] MONITORING DEVICE FOR AT LEAST ONE CURRENT PICKUP OF A CONVEYOR TRUCK IN A CONVEYOR SYSTEM RUNNING ON TRACKS

[75] Inventor: Herbert Pircher, Planegg, Fed. Rep. of Germany

[73] Assignee: Büropatent AG, Glarus, Switzerland

[21] Appl. No.: 543,721

[22] PCT Filed: Oct. 30, 1989

[86] PCT No.: PCT/CH89/00186
§ 371 Date: Jul. 11, 1990
§ 102(e) Date: Jul. 11, 1990

[87] PCT Pub. No.: WO90/86607
PCT Pub. Date: Jun. 14, 1990

[30] Foreign Application Priority Data

Nov. 30, 1988 [CH] Switzerland ............. 4459/88

[51] Int. Cl.⁵ .................................. G08B 21/00
[52] U.S. Cl. ......................... 340/635; 191/1 R; 250/202
[58] Field of Search ........... 340/635, 644, 657, 673; 250/202, 223 R, 571; 191/1 R

[56] References Cited

U.S. PATENT DOCUMENTS 4,184,145 1/1980 Fina ....................... 340/454
4,723,084 2/1988 Reynolds ............... 310/247

FOREIGN PATENT DOCUMENTS 8211408.3 11/1982 Fed. Rep. of Germany .
3510453 9/1986 Fed. Rep. of Germany .
60-200744 11/1985 Japan .

Primary Examiner—Jin F. Ng
Assistant Examiner—Jeffery A. Hofsass
Attorney, Agent, or Firm—Herbert Dubno

[57] ABSTRACT

A monitoring device is provided for at least one current pickup of a conveyor truck in a conveyor system running on tracks, whereby when viewed in a direction of travel the current pickup has a profile configuration which changes through wear as the pickup traverses a live rail. The device comprises a receiver for a test signal fixedly mounted on one side of the live rail, a transmitter mounted on the other side of the live rail, a test signal evaluating device that responds to a modified profile configuration of the current pickup resulting from wear, and an alarm signal triggered at a predetermined level of wear of the current pickup.

6 Claims, 1 Drawing Sheet

MONITORING DEVICE FOR AT LEAST ONE CURRENT PICKUP OF A CONVEYOR TRUCK IN A CONVEYOR SYSTEM RUNNING ON TRACKS

FIELD OF THE INVENTION

The invention relates to a monitoring device for at least one current pickup of a conveyor truck in a conveyor system running on tracks.

BACKGROUND OF THE INVENTION

A monitoring device for at least one current pickup of a conveyor truck in a conveyor system is known from DE-GM 82 11 804. Underneath several parallel sliding contacts a transversely running shaft is arranged with entrainment means for each sliding contact, which in the case of a worn-out current pickup is actuated by a thereto assigned trigger. On the shaft, a cam disk is mounted which actuates a fixed switch. A prestressed spring restores the shaft with its entrainment means and the cam disk to their initial monitoring position. The drawback is that, on the one hand this mechanical monitoring device is of a relatively complicated construction, and, on the other hand, it does not work with precision, particularly in the case of sliding contacts, where the differences in height between new and used ones are relatively small. Besides, it has to be taken into account that due to the tolerances of the conveyor truck in operation, particularly under load, such a contact is actuated sometimes too early and other times too late and this way a safe monitoring of the state of the current collectors is not possible.

It is the object of the present invention to improve the monitoring device of the above-described type.

SUMMARY OF THE INVENTION

A monitoring system is herein provided for at least one current pickup of a conveyor truck in a conveyor system running on tracks, whereby in the direction of travel the worn-down current pickup presents a characteristic wear feature which differs from the unworn state. On one side of a live rail of the system, a fixed receiver is mounted which responds to the wear signs of the worn-down current pickup. Upon a particular state of wear, an alarm system is triggered. This signal is generated from a transmitter located on an opposite side of the live rail. A test signal is sent from the transmitter to the receiver. The test signal responds to a modified configuration arranged in a direction of travel serving as a wear indicator of the current pickup.

The test signal relay which responds to a wear-produced shaped change of the current pickup simplifies the monitoring device and improves considerably the precision of the response. Besides, the error sources which in mechanical systems result from wear and the like are here eliminated.

For instance, a projection or a recess of the current pickup or pickups arranged in travel direction can serve as wear indicators, and in case of unacceptable wear can change the signal duration of the test signal so that it triggers an alarm signal.

The current pickup may be designed as a double-point current pickup, wherein an evaluation unit does not respond to signals coming in pair ($S_1$, $S_2$), but responds instead to single signals ($S_3$), preferably of the combined length of both signals coming in pairs ($S_1 + S_2$), triggering the alarm system. The use of two signals for a troublefree current pickup, as opposed to one signal for an objectionable current pickup, insures a secure monitoring operation, even with variable speeds of the conveyor trucks.

The test signal can be of a variety of types, particularly simple being an embodiment where the transmitter and the receiver are designed as a light barrier. Thereby it is particularly advantageous when such a light barrier is designed in the form of a light transmitter and light receiver each associated with the live rails via a photoconductor. This design makes possible an especially small construction, which can be fitted into already existing installation.

The monitoring device can be used for a single live rail with pertaining current pickup. However more advantageous is an embodiment wherein between the receiver and the transmitter at least two live rails are provided.

BRIEF DESCRIPTION OF THE DRAWING

Embodiment examples of the monitoring device of the invention are with the aid of the drawing, which shows.

DETAILED DESCRIPTION

Figure 1:
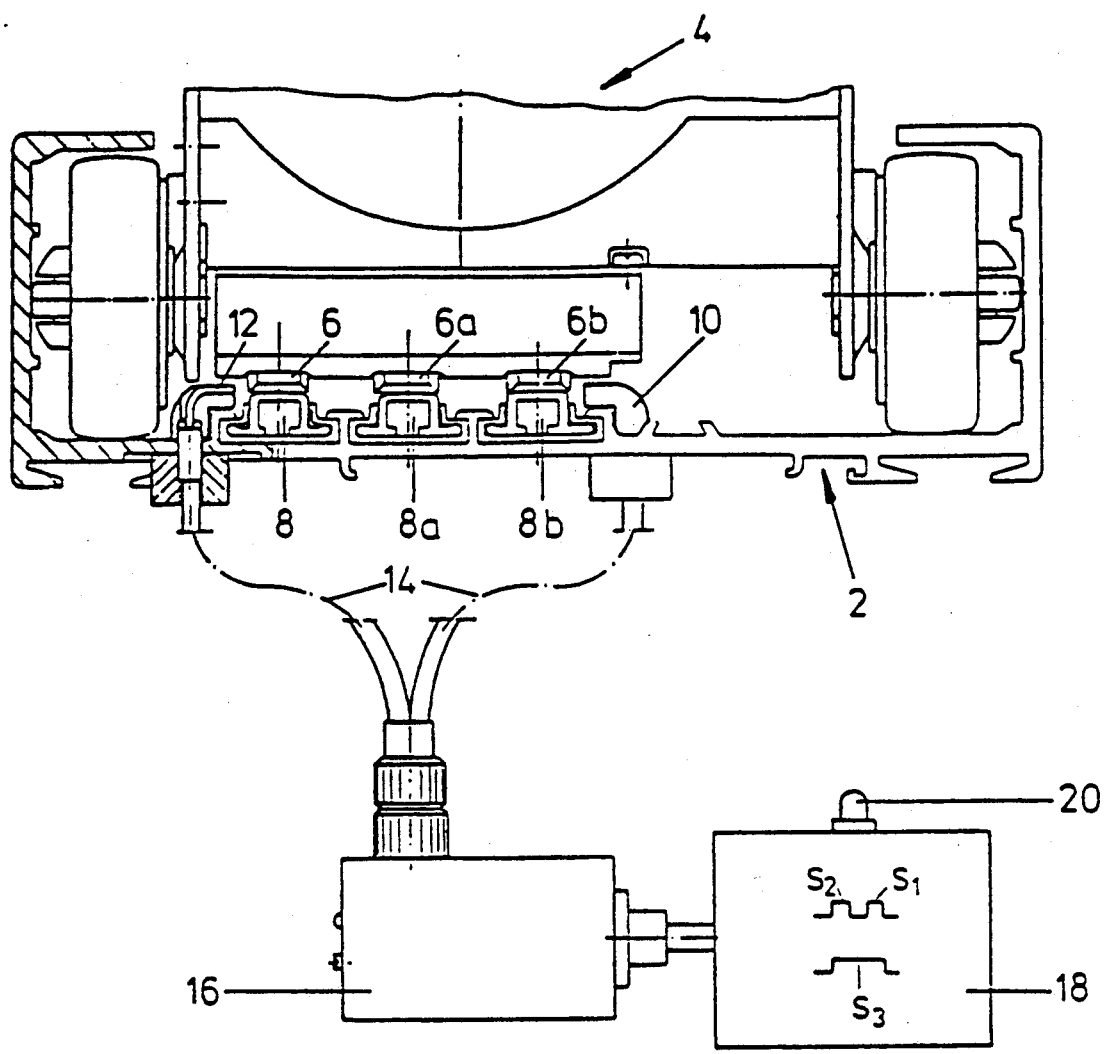
FIG. 1 a monitoring device on the rail of a conveyor system in a partially sectioned frontal view, parallel to the rail direction.
Figure 2:
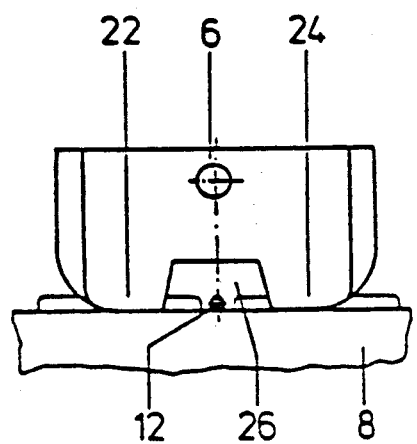
FIG. 2 the current pickup of FIG. 1 in a frontal view, transversely to the rail direction.

The monitoring device shown in FIGS. 1 and 2 is arranged on a rail 2 of a conveyor system running on tracks, travelled by a conveyor truck 4 connected via current pickups 6, 6a, 6b with corresponding live rails 8, 8a, 8b of the rail 2. The monitoring device has on one side of the live rails a transmitter 10 for the emission of a test signal which is received by a receiver 12 located on the other side of the live rails. The transmitter 10 and the receiver 12 are designed as a light relay which scans the area immediately above the live rails 8, 8a, 8b, responding to current pickups 6, 6a, 6b which slide by. The transmitter 10 and the receiver 12 are formed by photoconductors 14 connected to a corresponding device 16 comprising a light source, a photoelectric sensor and an amplifier, arranged in a known manner (not shown in drawing). This device is equipped with an evaluation unit 18 which analyses the incoming signals, and when a preselected degree of wear of the current pickups is reached, this unit triggers an alarm signal which in turn activates for instance an alarm light 20, an acoustic-signal generator or a further control unit of the conveyor system. Upon such warning signal the objectionable truck can be eliminated, for instance by changing the target code to a service station.

The shown embodiment example of the monitoring device responds to a modified shape of the current collector in the direction of travel. In the shown example, the current pickups consist of double-point current pickups, which have two projections 22 and 24 and a therebetween located recess 26, as can be seen from FIG. 2. When the current pickup is intact it produces two short signals $S_1$ and $S_2$ when passing by the monitoring device. A preselected degree of wear of the current pickups 6, 6a, 6b is indicated when the projections 22, 24 are used up to the point that the recess 26 disappears, which produces a single signal $S_3$ at the monitoring device lasting at least twice as long as the signals $S_1$ and $S_2$.

When the signal $S_3$ appears, a corresponding alarm signal of the mentioned kind is triggered in the evaluation unit 18.

Alternative to the illustrated embodiment variant, it is also possible to design the current pickups in a manner not shown in the drawing, shaped conically or in steps seen in the direction of travel, so that when the current pickup reaches a certain degree of wear it will also generate a signal which will be longer or shorter than the signal indicating an intact current pickup.

I claim:

1. A monitoring device for at least one current pickup of a conveyor truck in a conveyor system running on tracks, whereby said current pickup has a profile configuration which changes through wear as said pickup traverses a live rail, said device comprising:
   a means for transmitting a test signal from one side of said live rail between said current pickup and said live rail;
   a means for receiving said test signal from said transmitting means, said receiving means being fixedly mounted on a side opposite said one side of said live rail;
   a means for evaluating said test signal so that said device will respond to a modified profile configuration of said current pickup and serving as a wear indicator of said current pickup; and
   an alarm signal, said alarm signal being triggered at a predetermined level of wear of said current pickup as identified by said evaluating means.

2. A monitoring device according to claim 1 wherein said profile configuration of said current pickup comprises two projections separated by a recess, said projections contacting said live rail, said means for evaluating said test signal not responding to said test signal when said test signal arrives as a closely spaced pair of short signals, but does not respond to a relatively long single signal which then triggers said alarm signal.

3. A monitoring device according to claim 2 wherein said relatively long single signal lasts at least twice as long as said short signals in combined length.

4. A monitoring device according to claim 1, wherein said test signal is a light beam.

5. A monitoring device according to claim 4 wherein said light beam is directed over an area above said live rail, and said transmitters and receiving means being formed from at least one photoconductor.

6. A monitoring device according to claim 5 wherein at least two live rails are positioned between said transmitting and said receiving means.

* * * * *